(12) United States Patent
Wang et al.

(10) Patent No.: US 7,618,273 B1
(45) Date of Patent: Nov. 17, 2009

(54) MEMORY CARD CONNECTOR

(75) Inventors: Chin-Chou Wang, Tu-Cheng (TW);
Mei-Chuan Yang, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/190,451

(22) Filed: Aug. 12, 2008

(51) Int. Cl.
*H01R 13/62* (2006.01)

(52) U.S. Cl. ..................................................... 439/159

(58) Field of Classification Search .................. 439/159, 439/630, 326, 912, 677, 540.1, 188, 59–62, 439/67; 361/737, 741, 726, 728, 736, 752, 361/756, 802, 807
See application file for complete search history.

(56) References Cited

U.S. PATENT DOCUMENTS 6,383,027 B2 * 5/2002 Cabane et al. .............. 439/630
7,238,038 B2 * 7/2007 Kumagai .................... 439/326
7,390,204 B2 * 6/2008 Tanaka et al. ............... 439/159
7,452,241 B2 * 11/2008 Kikuchi et al. .............. 439/630

* cited by examiner

*Primary Examiner*—Edwin A Leon (57) ABSTRACT

A memory card connector adapted for selectively receiving one of a first and second types of cards therein. It includes a dielectric housing having a base and at least four surrounding walls disposed at circumference of the base. The base and the four surrounding walls define a recess therebetween in combination. A plurality of terminals is positioned in the recess of the dielectric housing. At least one resilient element is positioned in the recess of the dielectric housing. The resilient element is such that it can be elastically pressed downwardly by the first type of the card during insertion of said type of the card and thus is retracted in the base or urge against an edge of the second type of the card during insertion of the second card. The memory card connector of the present invention has a relatively small size and can selectively receive the first and second types of the cards.

11 Claims, 10 Drawing Sheets

MEMORY CARD CONNECTOR

BACKGROUND OF THE INVENTION

1. Field of the Invention

The present invention generally relates to a connector, and more particularly to a memory card connector adapted for selectively receiving anyone of two different memory cards.

2. The Related Art

In recent years, memory cards have become popular and a wide variety of memory cards have been used, which are different in outer shape, contact pad position or the like. The memory card connector is provided to be used in an electronic appliance to adapt a memory card.

Micro SD card (Micro Secure Digital Card) and M2 card (Memory Stick Micro Card) are widely used because of small size, large storage capacity and high speed of the data transmission. As the Micro SD card and the M2 card have different outer shapes and contact pad positions, in order to use the two kinds of memory cards in an electronic device, two ways are provided to solve the problem. One way is that a Micro SD memory card connector and a M2 memory card connector are independently disposed in the electronic device for respectively receiving the two kinds of memory cards. Another way is that two grooves are arranged abreast or stacked together in a memory card connector for respectively receiving the two kinds of memory cards.

However, We can easily find that the designs described above have inevitably increased the height or the size of the memory card connector and the difficulty of the assemblage, which are not conducive to the microminiaturization of the electronic device.

SUMMARY OF THE INVENTION

An object of the present invention is to provide a memory card connector which has a relatively small size and can selectively receive anyone of two different types of memory cards of different sizes and specifications. The memory card connector adapted for selectively receiving one of a first and second types of cards therein. It includes a dielectric housing having a base and at least four surrounding walls disposed at circumference of the base. The base and the four surrounding walls define a recess therebetween in combination. A plurality of terminals is positioned in the recess of the dielectric housing. At least one resilient element is positioned in the recess of the dielectric housing. The resilient element is such that it can be elastically pressed downwardly by the first type of the card during insertion of said type of the card and thus is retracted in the base or urge against an edge of the second type of the card during insertion of the second card. The memory card connector of the present invention has a relatively small size and can selectively receive anyone of two different types of memory cards of different sizes and specifications.

The second type of the memory card having a smaller size can be received in the memory card connector by one side of the memory card abutting against the resilient element. The first type of the memory card having a relatively larger size can be received in the memory card connector by pressing the resilient element downwardly. So the memory card connector of the present invention has a relatively smaller size and can receive selectively receive anyone of two different memory cards of different sizes and specifications.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
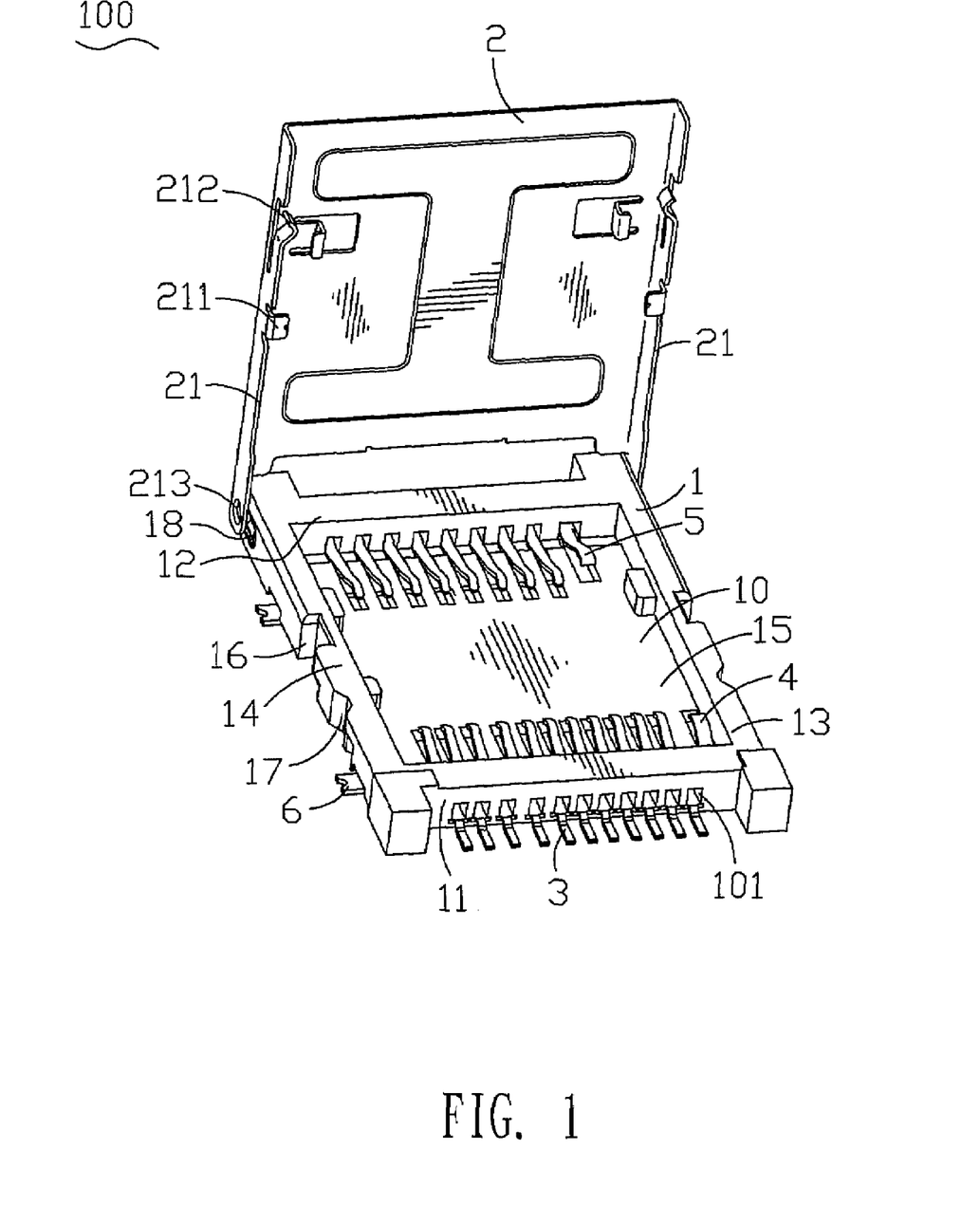
FIG. 1 is a perspective view of a memory card connector according to a first embodiment of the present invention.

FIG. 1 is a view illustrating a first embodiment of the present invention. In this embodiment, a memory card connector 100 includes a dielectric housing 1, a plurality of terminals 3 mounted in the dielectric housing 1, a cover 2 pivotally mounted to the dielectric housing 1, a first resilient element 4 and a second resilient element 5.

Figure 2:
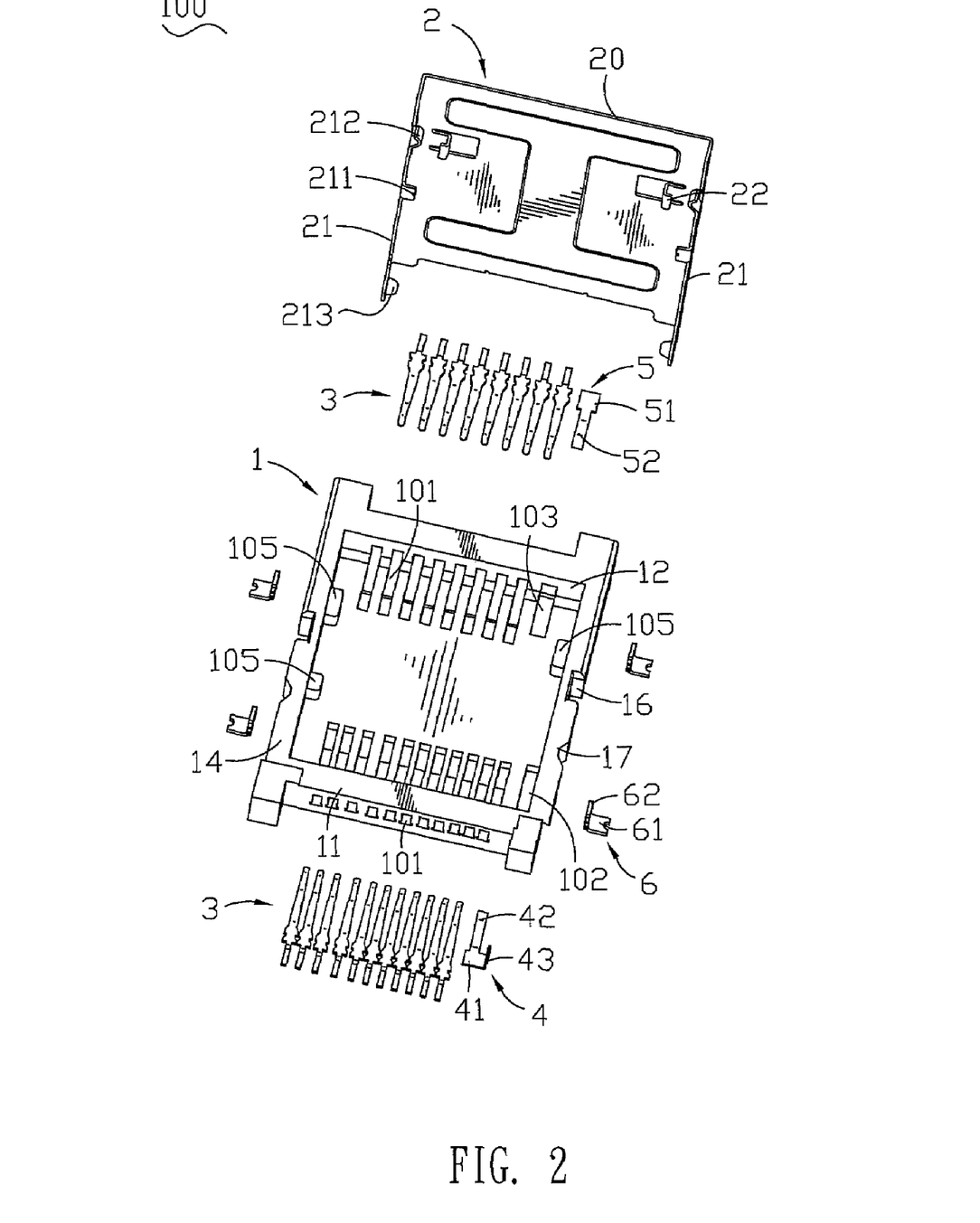
FIG. 2 is an exploded view of the memory card connector in FIG. 1.
Figure 3:
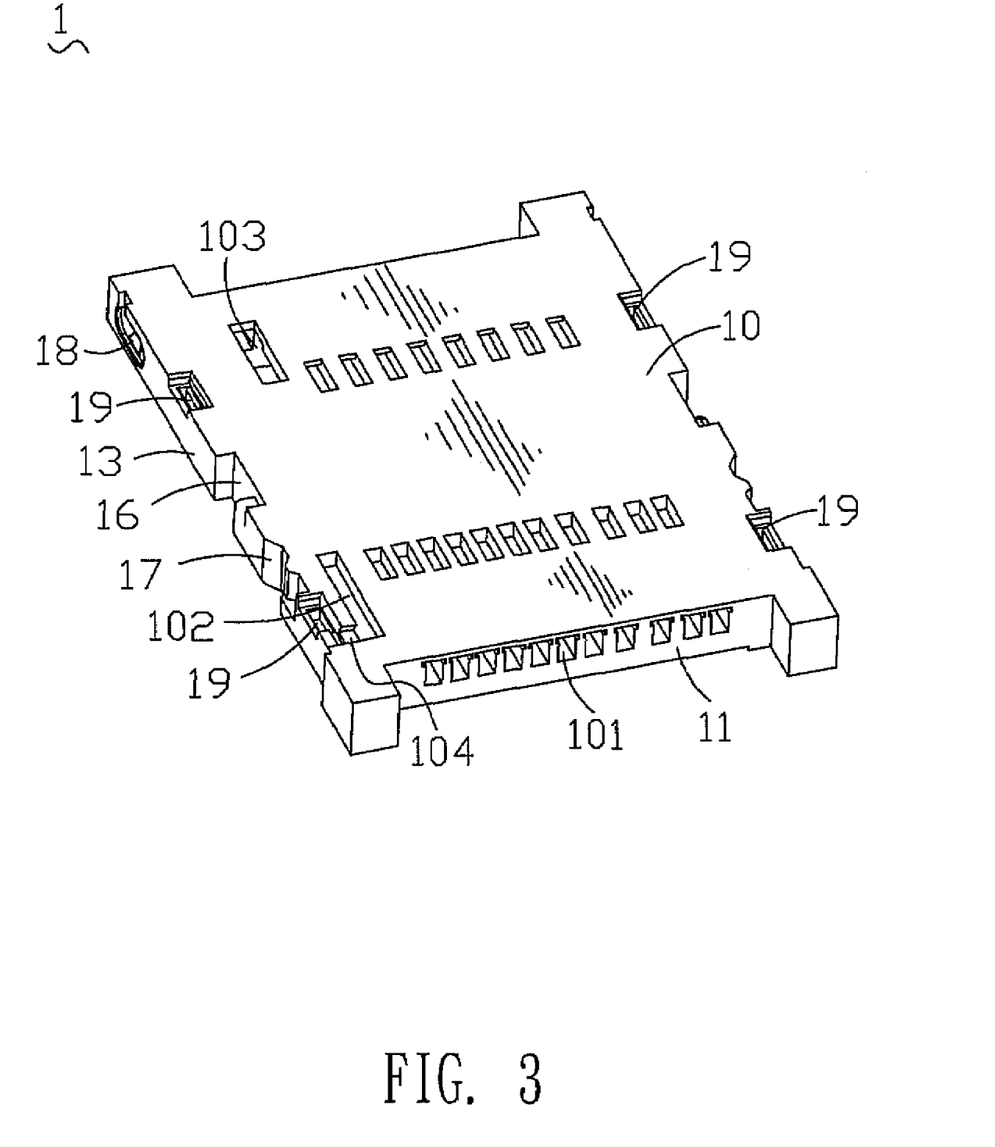
FIG. 3 is another perspective view of a dielectric housing of the memory card connector in FIG. 1.

With reference to FIGS. 1-3, the dielectric housing 1 is substantially of a rectangular configuration. The housing 1 includes a front wall 11, a rear wall 12, a left wall 13 and a right wall 14 all of which are interconnected sequentially with each other so as to define a base 10 therein between. It is noted that the base 10 is somewhat recessed relative to the walls described above such that a recess 15 is defined by the front wall 11, the rear wall 12, the left wall 13 and the right wall 14 as well as the base 10 in combination. Two rows of terminal slots 101 penetrate the base 10 along its thickness direction at the front and rear end thereof respectively. Moreover, the two rows of the terminal slots 101 also penetrate the front wall 11 and the rear wall 12 respectively for receiving the terminals 3 therein. A first receiving slot 102 and a second receiving slot 103 are respectively defined in the front end and the rear end of the base 10 and penetrate the base 10. In addition, the first receiving slot 102 and the second receiving slot 103 are both parallel to the two rows of terminal slots 101. A connecting slot 104 of an L-shape is defined in a bottom of the base 10 and under the left wall 13 and communicates with the first receiving slot 102. One end, which is adjacent the rear wall 12, of the left wall 13 protrudes towards the recess 15 to form a projection 105 of a rectangular shape. Similarly, each end of the right wall 14 also protrudes towards the recess 15 to form a projection 105 of a rectangular shape. A first notch 16 and a second notch 17 are formed in the outer side of the left wall 13 respectively. Similarly, a first notch 16 and a second notch 17 are also defined in the outer side of the right wall 14. A pair of sliding grooves 18 is respectively formed on the outer sides of the left wall 13 and the right wall 14 near the rear wall 12. A plurality of sockets 19 is formed in the bottom of the base 10 and below the left wall 13 and the right wall 14. And one of the sockets 19 communicates with the connecting slot 104.

Referring to FIGS. 1 and 2, the cover 2 is made of the sheet metal material by the way of stamping. The cover 2 is pivotally mounted at the back end of the dielectric housing 1 (more concretely, the cover 2 is pivoted in the sliding grooves 18 defined at the left and right walls thereof). The cover 2 includes a top member 20 and a pair of side arms 21 extending downward from both lateral sides of the top member 20. The top member 20 is pierced appropriately and then bent partially so as to form two pressing portions 22 which are substantially of an L-shape. The middle portion of each side arm 21 protrudes inwardly to form a first fixing plate 211 for engaging with the first notch 16 of the dielectric housing 1. One end of each side arm 21 is cut partially and then bent inwardly to form a second fixing portion 212 for engaging with the second notch 17 of the dielectric housing 1. By contrast, the other end of each side arm 21 protrudes inwardly to form a pivot 213 for pivotally engaging with the sliding groove 18.

Please refer to FIGS. 1 and 2, the first resilient element 4 has a first holding portion 41 of a rectangular shape, a first contact portion 42 extended slantwise and upwardly from the first holding portion 41 and a first inserting portion 43 which is also extended perpendicularly and upwardly from the first holding portion 41. The second resilient element 5 has a second holding portion 51 of a rectangular shape and a second contact portion 52 which is extended from the second holding portion 51 slantways and upwardly. The first resilient element 4 and the second resilient element 5 are disposed near the left wall 13 of the dielectric housing 1.

Referring to FIG. 2, a plurality of fixing elements 6 is provided to fix the memory card connector 100 on an electronic device (not shown). Each of the fixing elements 6 has a fixing portion 61 and a second inserting portion 62 which runs perpendicularly upon one side of the fixing portion 61.

Figure 4:
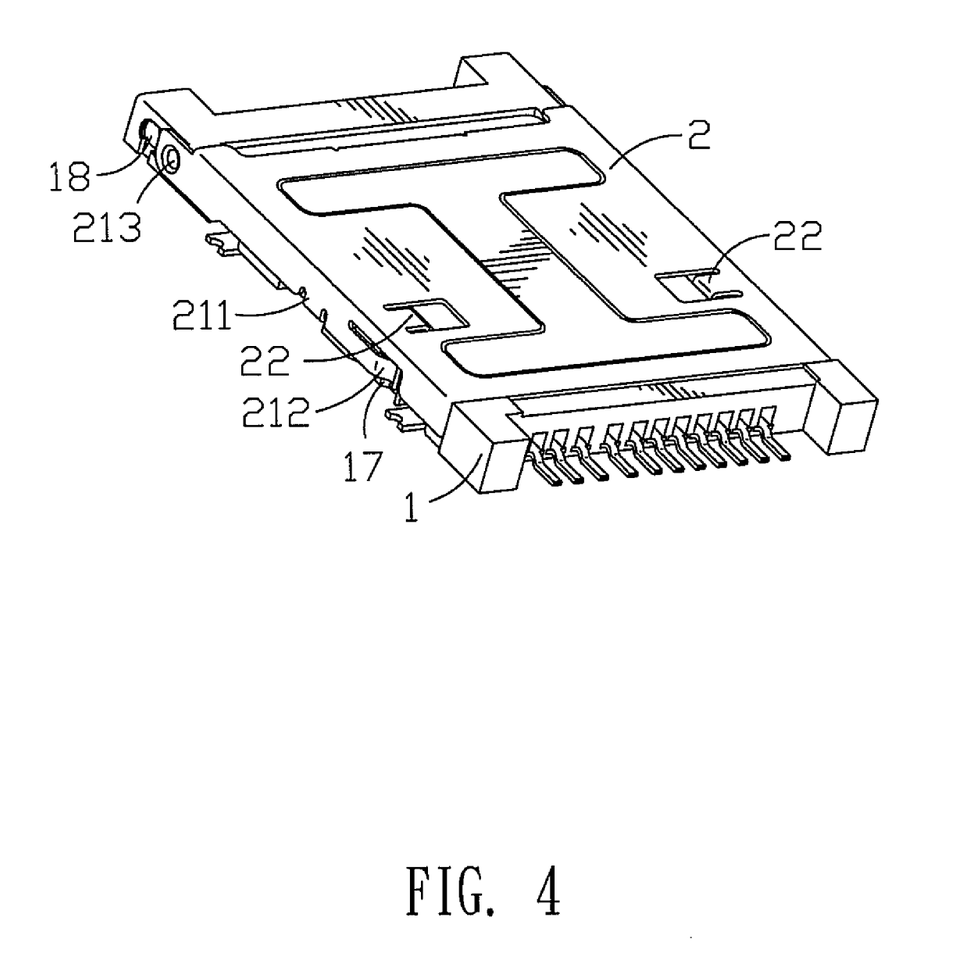
FIG. 4 is a perspective view of the memory card connector with a cover covering the dielectric housing.

Please refer to FIGS. 1, 2 and 4, during assembly, the terminals 3 are received in the corresponding terminal slots 101 of the dielectric housing 1. The first holding portion 41 of the first resilient element 4 and the second holding portion 51 of the second resilient element 5 are respectively received in the first receiving slot 102 and the second receiving slot 103 of the dielectric housing 1. The first contact portion 42 and the second contact portion 52 are positioned in the recess 15 of the dielectric housing 1. The first inserting portion 43 is inserted into the connecting slot 104. The distance between the peak of the first resilient element 4 and the base 10 is larger than that between the peak of the terminals 3 and the base 10. The distance between the peak of the second element 5 and the base 10 is also larger than that between the peak of the terminals 3 and the base 10. The second inserting portions 62 of the fixing elements 6 are respectively inserted into the corresponding sockets 19. The two pivots 213 of the cover 2 are pivotally inserted into the two sliding grooves 18 respectively. When the cover 2 envelops the dielectric housing 1, the first fixing plates 211 and the second fixing plates 212 of the cover 2 are respectively received in the first notches 16 and the second notches 17 of the dielectric housing 1.

Figure 5:
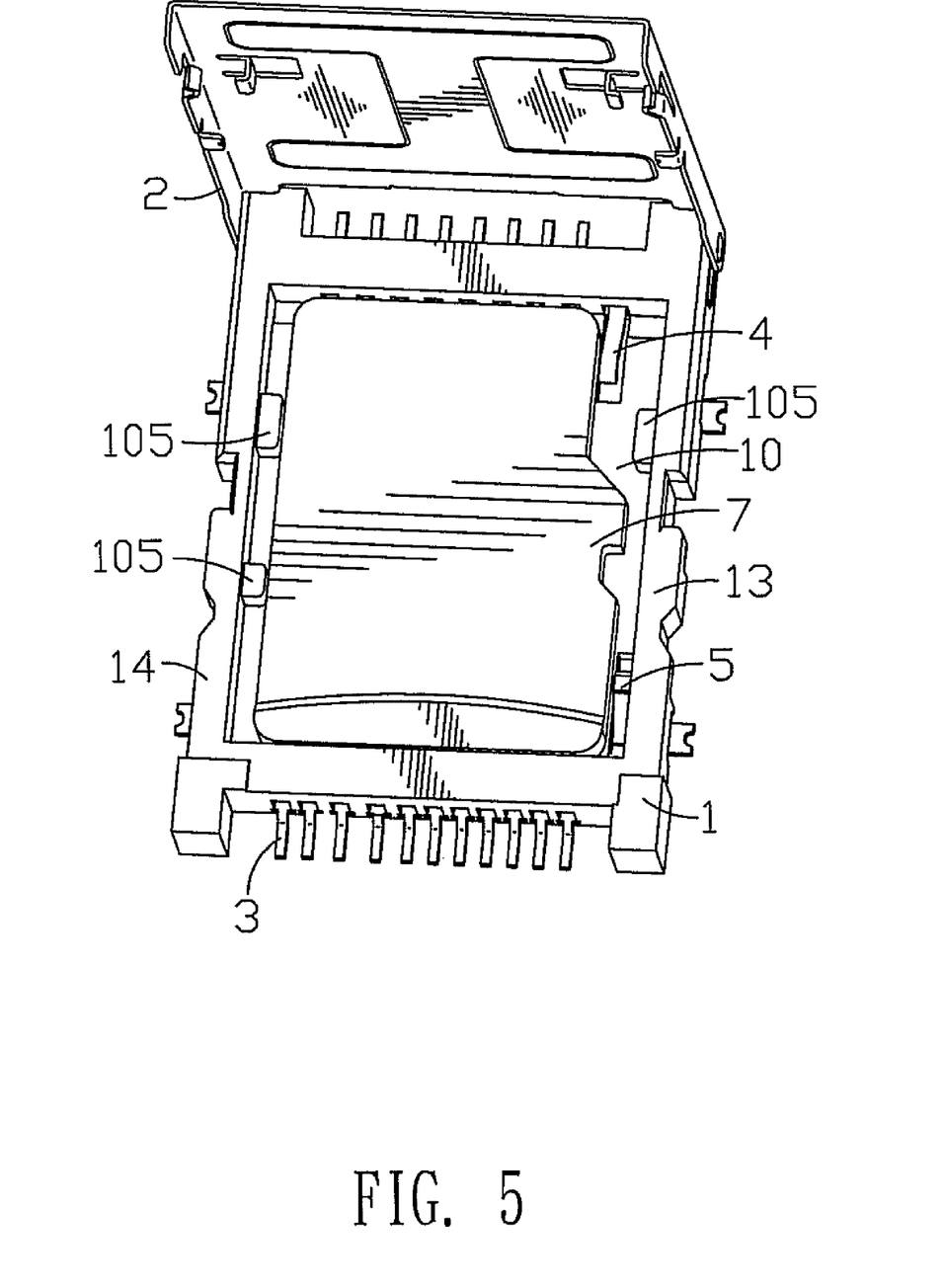
FIG. 5 is a perspective view of the memory card connector shown in FIG. 1 assembled with a Micro SD card therein.

Please refer to FIG. 5, a Micro SD card 7 is received in the recess 15 of the dielectric housing 1. Because the distance between the peak of the first resilient element 4 and the base 10 is larger than that of the peak of the terminals 3 and the base 10, and the distance between the peak of the second element 5 and the base 10 is also larger than that of the peak of the terminals 3 and the base 10, and due to the shape of the Micro SD card 7, the first resilient element 4 and the second resilient element 5 abut against one side of the Micro SD card 7, while the projections 105 formed in the right wall 14 abut against the opposite side of the Micro SD card 7. Therefore, the Micro SD card 7 is fixed in the recess 15 and electrically connects with the terminals 3. When the cover 2 covers the dielectric housing 1 and the Micro SD card 7, the pressing portions 22 press against the Micro SD card 7 to ensure the electrical connection between the Micro SD card 7 and the terminals 3 steady.

Figure 6:
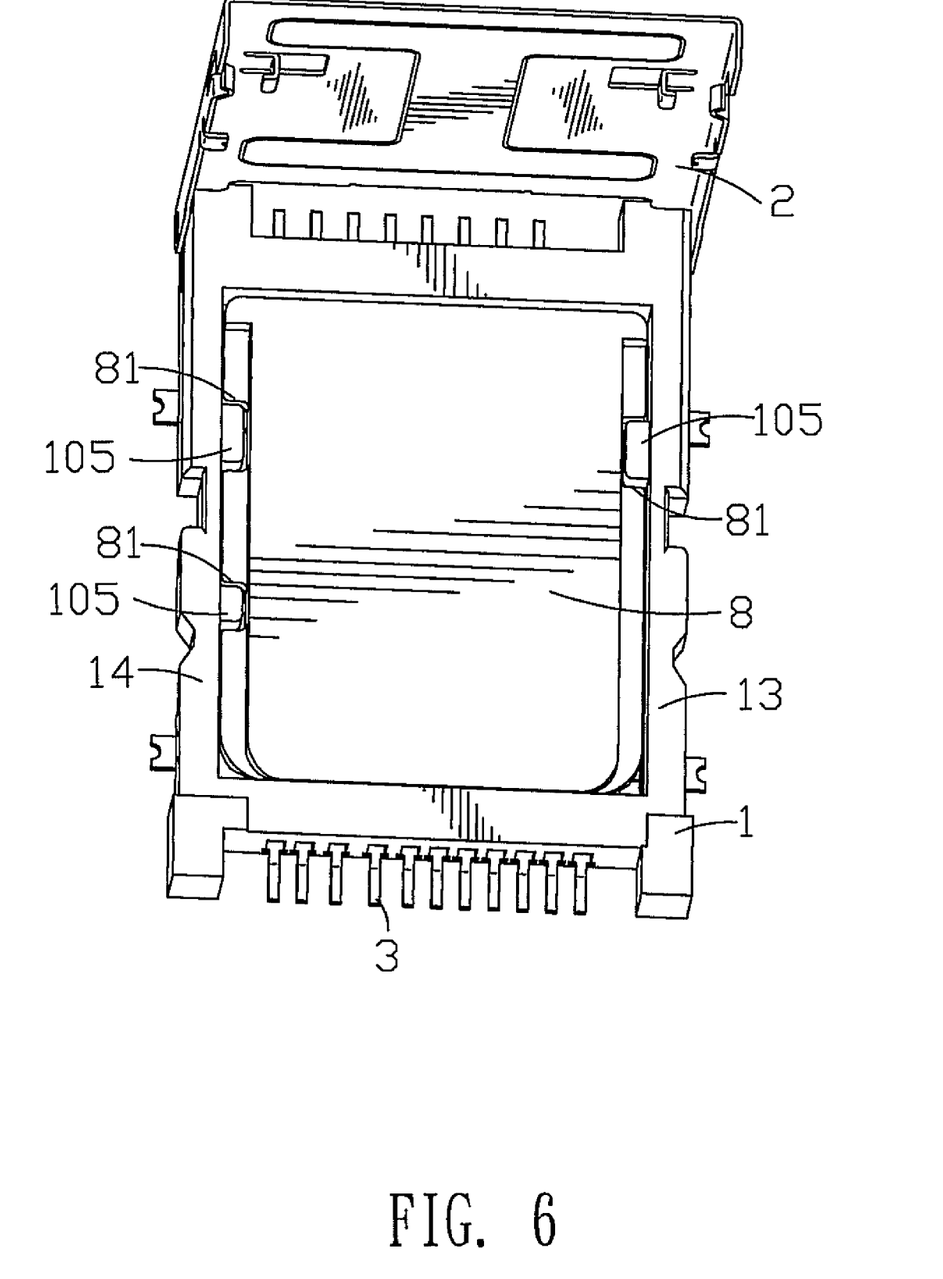
FIG. 6 is a perspective view of the memory card connector shown in FIG. 1 assembled with a M2 card therein.

Please refer to FIG. 6, a M2 card 8 having a plurality of gaps 81 on two opposite sides thereof is received in the recess 15 of the dielectric housing 1. Due to the shape of the M2 card 8, the first resilient element 4 and the second resilient element 5 is pressed down to the first receiving slot 102 and the second receiving slot 103 respectively. The projections 105 mate with the gaps 81 to fix the M2 card 8 in the recess 15. When the cover 2 covers the dielectric housing 1 and the M2 card 8, the pressing portions 22 press against the M2 card 8 to ensure the electrical connection of the M2 card 8 and the terminals 3 steady.

Figure 7:
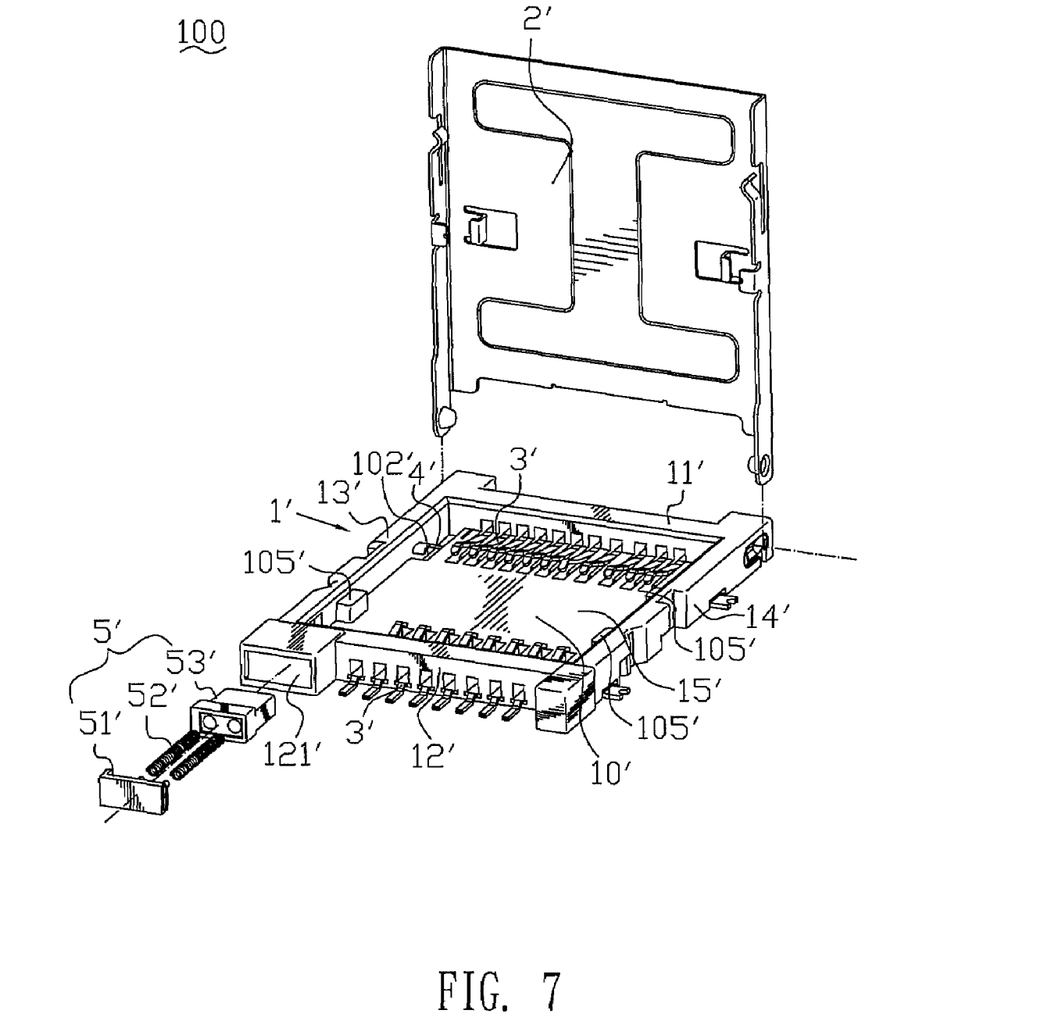
FIG. 7 is an exploded view of a memory card connector according to a second embodiment of the present invention.

FIG. 7 is a view illustrating a second embodiment of the present invention. This embodiment is similar to the first embodiment, and in this embodiment the memory card connector 100 includes a dielectric housing 1', a plurality of terminals 3' mounted in the dielectric housing 1', a cover 2' pivotally mounted to the dielectric housing 1', a first resilient element 4' and a limiting element 5'. The terminals 3' and the cover 2' are the same as the terminals 3 and the cover 2 in the first embodiment.

The dielectric housing 1' is similar to the dielectric housing 1 in the first embodiment. The dielectric housing has a base 10'. A front wall 11', a rear wall 12', a left wall 13' and a right wall 14' respectively extend upwardly from four sides of the base 10' and a recess 15' is defined by the walls and the base 10' collectively. A first receiving slot 102' is defined in the base 10' and adjacent to the left wall 13'. Three slits (not shown) are formed in the base 10' around the first receiving slot 102'. One end of the left wall 13' near the rear wall 12', and two ends of the right wall 14' respectively protrude inward to form a projection 105'. A cavity 121' is formed at the junction of the rear wall 12' and the left wall 13' and passes through the rear wall 12' to communicate with the recess 15'. Two fixing slots (not shown) are respectively formed in two sidewalls of the cavity 121'.

Figure 8:
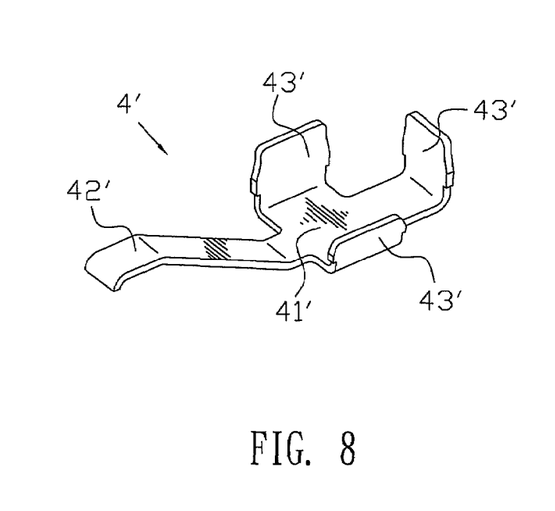
FIG. 8 is a perspective view of a first resilient element of the memory card connector shown in FIG. 7.

Referring to FIGS. 7 and 8, the first resilient element 4' has a holding portion 41' of a rectangular shape fixed in the first receiving slot 102'. A contact portion 42' slantwise extends upwardly from one side of the holding portion 41' and three inserting portions 43' perpendicularly extend upwardly from the rest three sides of the holding portion 41' respectively. The inserting portions 43' are received in the slits of the dielectric housing 1' for fixing the holding portion 41' in the base 10' of the dielectric housing 1'. The contact portion 42' extends into the recess 15'. The distance between the peak of the resilient element 4' and the base 10' is larger than that between the peak of the terminals 3' and the base 10'.

Figure 9:
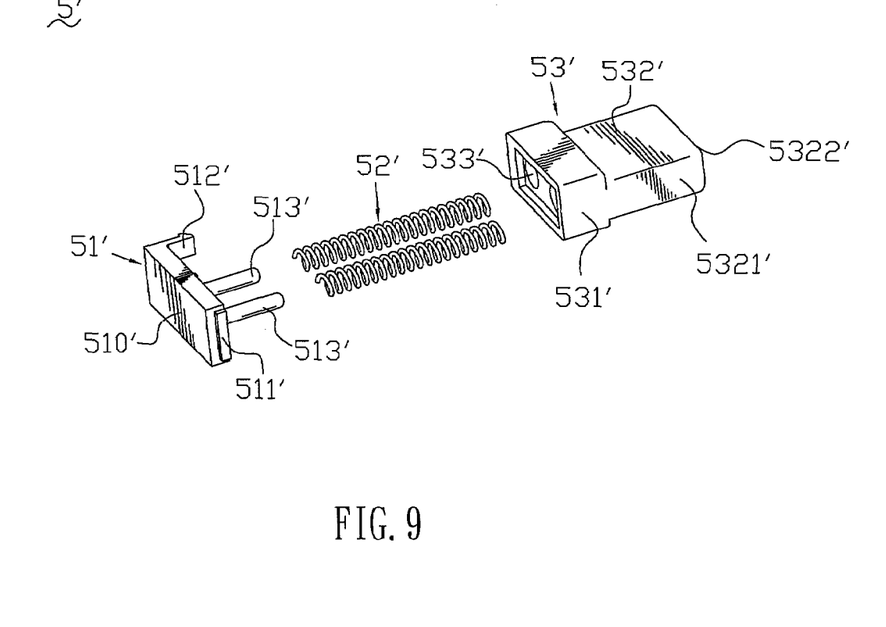
FIG. 9 is a perspective view of a second resilient element of the memory card connector shown in FIG. 7.

Please refer to FIGS. 7 and 9, the limiting element 5' is received in the cavity 121' of the dielectric housing 1'. The limiting element 5' includes a fixing member 51', an elastic member 52' and a sliding member 53'. The fixing member 51' has a rectangular basic board 510'. A first retaining portion 511' protrudes outward from one side of the basic board 510' and a second retaining portion 512' perpendicularly extends from the other side of the basic board 510' opposite the first retaining portion 511'. The first retaining portion 511' and the second retaining portion 512' are respectively received in corresponding fixing slots formed in the cavity 121' of the dielectric housing 1' to fix the fixing member 51' in the cavity 121'. Two rods 513' project forward from the basic board 510'.

The sliding member 53' includes a stopping portion 531' and an extending portion 532' extending forward from one end of the stopping portion 531'. The stopping portion 531' is slidably received in the cavity 121'. The extending portion 532' passes through the cavity 121' and extends out of the cavity 121' (more specifically runs into the recess 15). The extending portion 532' has a first limiting side 5321' and a second limiting side 5322' both of which are substantially orthogonal to each other. Two blind holes 533' are formed in the sliding member 53' and pass through the stopping portion 531' and a part of the extending portion 532'.

In this embodiment, the elastic member 52' are two coils of springs. One end of each spring 52' tightly surrounds the rod 513', and the other end is received in the blind hole 533'. The extending portion 532' of the sliding member 53' is pushed in the recess 15' of the dielectric housing 1' due to the elasticity of the springs 52'.

Figure 10:
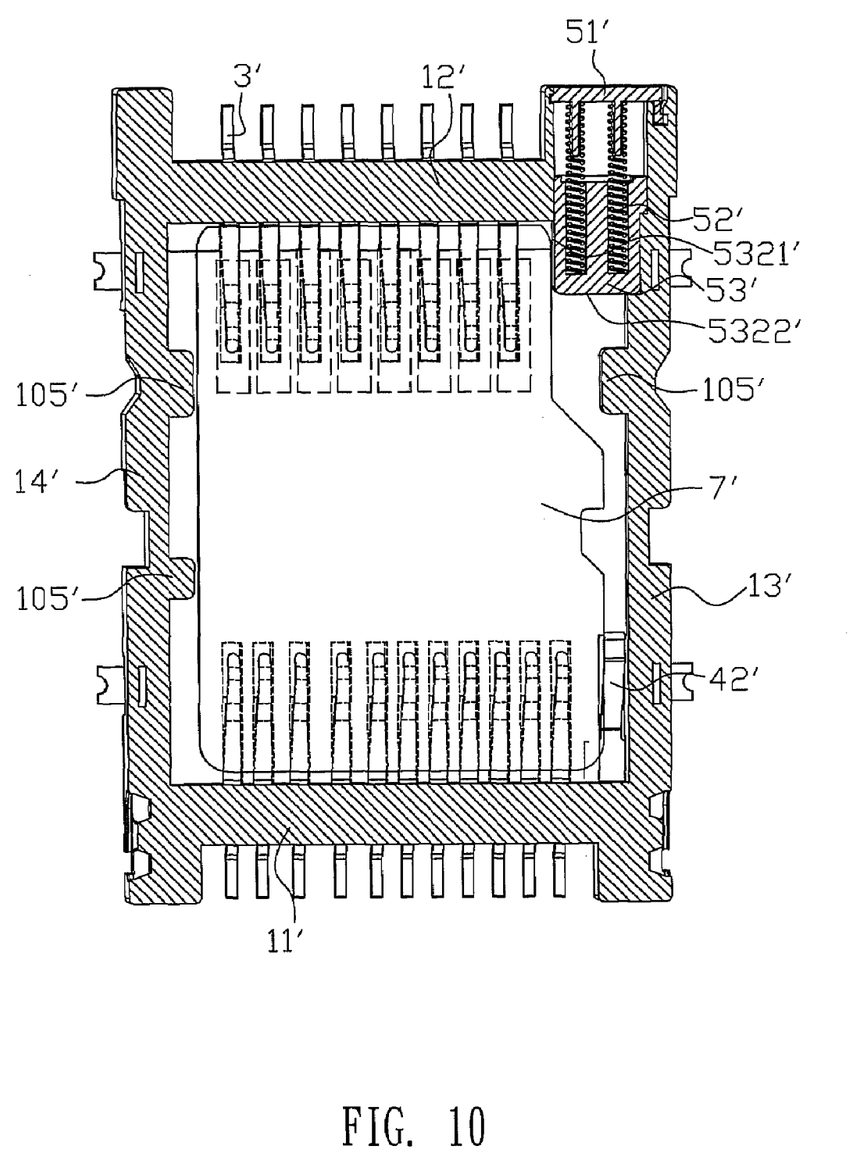
FIG. 10 is a perspective view of the memory card connector shown in FIG. 7 assembled with a Micro SD card therein.

Please refer to FIG. 10, a Micro SD card 7' is received in the recess 15' of the dielectric housing 1'. One side of the Micro SD card 7' is restricted by the projections 105' formed on the right wall 14' and the opposite side of the Micro SD card is restricted by the first resilient element 4' and the first limiting side 5321' of the extending portion 532' of the limiting element 5'. The cover 2' is closed on the dielectric housing 1' and ensures the electrical connection between the Micro SD card 7' and the terminals 3' securely.

Figure 11:
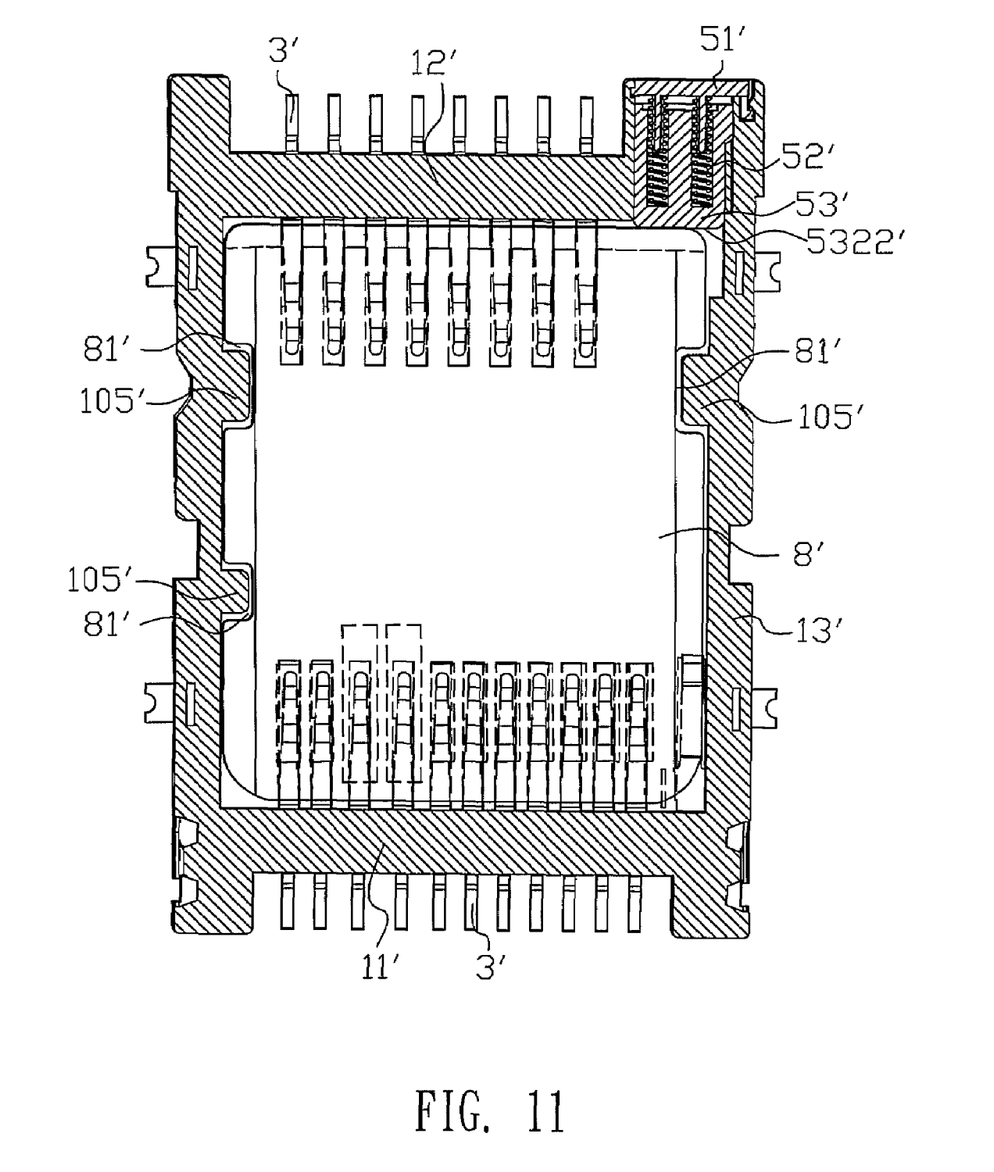
FIG. 11 is a perspective view of the memory card connector shown in FIG. 7 assembled with a M2 card therein.

Please refer to FIG. 11, a M2 card 8' having a plurality of gaps 81' on two opposite sides thereof is received in the recess 15' of the dielectric housing 1'. When the M2 card 8' is inserted the dielectric housing 1', one end of the M2 card 8' firstly pushes the second limiting side 5322' of the extending portion 532' of the sliding member 53' for pushing the extending portion 532' into the cavity 121', and then the M2 card 8' presses the contact portion 42' of the first resilient element 4' into the receiving slot 102'. The gaps 81' respectively mate with the projections 105'. The cover 2' is covered on the dielectric housing 1' and ensures the electrical connection between the M2 card 8' and the terminals 3' securely.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A memory card connector adapted for selectively receiving one of a first and second types of cards therein, comprising:
   a dielectric housing having a base and at least four surrounding walls disposed at circumference of the base, the base and the four surrounding walls defining a recess therebetween in combination;
   a plurality of terminals positioned in the recess of the dielectric housing;
   at least one resilient element positioned in the recess of the dielectric housing, wherein the resilient element is such that it can be elastically pressed downwardly by the first type of the card during insertion of said type of the card and thus is retracted in the base or urged against an edge of the second type of the card during insertion of the second card; and
   a limiting element disposed substantially in one corner of the dielectric housing and extended into the recess, the limiting element defining a first limiting side and a second limiting side substantially orthogonal to each other, the limiting element being capable of abutting against an edge of one of the two types of cards by the first limiting side and being pushed outwardly for elastically abutting against the other type of the card by the second limiting side,
   wherein the limiting element comprises a fixing member fixed in the dielectric housing, a sliding member extended into the recess for abutting against the corresponding card, and an elastic member disposed and secured between the fixing member and the sliding member.

2. The memory card connector as claimed in claim 1, further comprising a cover pivotally connected with and covered on the dielectric housing for electrically and stably holding the card therebetween.

3. The memory card connector as claimed in claim 1, wherein the memory card connector comprises two resilient elements both of which are positioned in the recess of the dielectric housing and near the same surrounding wall of the dielectric housing.

4. The memory card connector as claimed in claim 1, wherein the at least one resilient element has a holding portion fixed in the dielectric housing and a contact portion slantwise extending upward from one end of the holding portion and located in the recess for being elastically pressed downwardly by the first type of the card or abutting against the edge of the second type of the card.

5. The memory card connector as claimed in claim 1, wherein the dielectric housing further comprises at least one projection which is disposed to be adjacent to one of the side walls and located in the recess for restricting a corresponding card.

6. A memory card connector adapted for selectively receiving one of a first and second types of cards therein, each of the first and second types of cards having a flat contact surface and four side edges, the memory card connector comprising:
   a dielectric housing having a base and at least four surrounding walls disposed at circumference of the base, the base and the four surrounding walls defining a recess therebetween in combination for selectively receiving one of the first and second types of cards therein, the base facing the flat contact surface and the four surrounding walls surrounding the respective side edges when one of the first and second types of cards is placed in the recess;
   a plurality of terminals positioned in the recess of the dielectric housing; and
   at least one resilient element positioned in a side of the recess adjacent to one of the surrounding walls, wherein the resilient element is elastically pressed downwardly to retract into the base by the flat contact surface of the first type of the card when the first type of the card is placed in the recess or against one of the side edges of the second type of the card when the second type of the card is placed in the recess.

7. The memory card connector as claimed in claim 6, further comprising a cover pivotally connected with and covered on the dielectric housing for electrically and stably holding the card therebetween.

8. The memory card connector as claimed in claim 6, wherein the memory card connector comprises two resilient elements both of which are positioned in the recess of the dielectric housing and near the same surrounding wall of the dielectric housing.

9. The memory card connector as claimed in claim 6, wherein the at least one resilient element has a holding portion fixed in the dielectric housing and a contact portion slantwise extending upward from one end of the holding portion and located in the recess for being elastically pressed downwardly by the first type of the card or abutting against the edge of the second type of the card.

10. The memory card connector as claimed in claim 6, wherein the dielectric housing further comprises at least one projection which is disposed to be adjacent to one of the side walls and located in the recess for restricting a corresponding card.

11. The memory card connector as claimed in claim 6, further comprising a limiting element disposed substantially in one corner of the dielectric housing and extended into the recess, the limiting element defining a first limiting side and a second limiting side substantially orthogonal to each other, the limiting element being capable of abutting against an edge of one of the two types of cards by the first limiting side and being pushed outwardly for elastically abutting against the other type of the card by the second limiting side.

* * * * *